(12) United States Patent
Saint-Macary

(10) Patent No.: US 10,112,492 B2
(45) Date of Patent: Oct. 30, 2018

(54) METHOD FOR CONTROLLING A DC/DC VOLTAGE STEP-DOWN CONVERTER

(71) Applicants: CONTINENTAL AUTOMOTIVE FRANCE, Toulouse (FR); CONTINENTAL AUTOMOTIVE GMBH, Hannover (DE)

(72) Inventor: Stephane Saint-Macary, Toulouse (FR)

(73) Assignees: CONTINENTAL AUTOMOTIVE FRANCE, Toulouse (FR); CONTINENTAL AUTOMOTIVE GMBH, Hannover (DE)

(*) Notice: Subject to any disclaimer, the term of this patent is extended or adjusted under 35 U.S.C. 154(b) by 159 days.

(21) Appl. No.: 14/889,881

(22) PCT Filed: Jun. 25, 2014

(86) PCT No.: PCT/EP2014/001724
§ 371 (c)(1),
(2) Date: Nov. 9, 2015

(87) PCT Pub. No.: WO2014/206556
PCT Pub. Date: Dec. 31, 2014

(65) Prior Publication Data
US 2016/0075238 A1  Mar. 17, 2016

(30) Foreign Application Priority Data
Jun. 26, 2013  (FR) ...................... 13 56161

(51) Int. Cl.
*B60L 1/00* (2006.01)
*B60L 11/18* (2006.01)
(Continued)

(52) U.S. Cl.
CPC ............. *B60L 11/18* (2013.01); *H02M 3/156* (2013.01); *H02M 2001/0003* (2013.01)

(58) Field of Classification Search
CPC ..... H02M 1/088; H02M 3/1582; H02M 3/156
(Continued)

(56) References Cited

U.S. PATENT DOCUMENTS 4,519,038 A * 5/1985 Matsui ............... F02P 3/0456
123/406.65
5,561,596 A    10/1996 Hemena et al.
(Continued)

FOREIGN PATENT DOCUMENTS

CN           1116741 A       2/1996

OTHER PUBLICATIONS

Jugurtha Hadjar et al.: "Trigger de Schmitt a Amplificateur Operationnel", Dec. 31, 2011 (Dec. 31, 2011), XP055121375, Retrieved from the Internet: URL:http://docs.com/Download/DownloadDoc/user/1510367946/doc/ ede3cb96474a4c118a75ad5765b28397 [retrieved on Jun. 3, 2014] page 4.
(Continued)

*Primary Examiner* — Alfonso Perez Borroto
(74) *Attorney, Agent, or Firm* — Young & Thompson

(57) ABSTRACT

A method for controlling a voltage step-down converter (20) including an inductive component (21), one terminal of which is connected to an electrical source (50) via a regulating switch (24), while its other terminal is connected to a capacitive component (22), the output of the voltage step-down converter being regulated by alternating connection intervals, during which the regulating switch is in an on state, with disconnection intervals, during which the regulating switch is in an off state, the regulating switch being switched from the on state to the off state when the value of the output voltage reaches a disconnection threshold. The disconnection threshold has a variable value which decreases progressively, during each connection interval, from a maximum value of the disconnection threshold.

14 Claims, 3 Drawing Sheets

(51) Int. Cl.
*H02M 3/156* (2006.01)
*H02M 1/00* (2006.01)

(58) Field of Classification Search
USPC .................................................. 307/10.1
See application file for complete search history.

(56) References Cited

U.S. PATENT DOCUMENTS

| | | | |
|---|---|---|---|
| 5,563,758 A | 10/1996 | Dembrosky et al. | |
| 6,140,808 A | 10/2000 | Massie | |
| 8,018,212 B1* | 9/2011 | Petricek | H02M 3/1582 |
| | | | 323/259 |
| 2004/0239300 A1* | 12/2004 | Sutardja | H02M 1/088 |
| | | | 323/283 |
| 2007/0024257 A1 | 2/2007 | Boldo | |

OTHER PUBLICATIONS

Radim Smat: "Introduction to comparators, their parameters and basic applications", Oct. 1, 2012 (Oct. 1, 2012), XP055121406, Retrieved from the Internet: URL:http://www.st.com/st-web-ui/static/active/en/resource/technical/document/application note/DM00050759.pdf [retrieved on Jun. 3, 2014] figures 22-24 paragraph [04.3].
International Search Report, dated Oct. 6, 2014, from corresponding PCT application.

* cited by examiner

METHOD FOR CONTROLLING A DC/DC VOLTAGE STEP-DOWN CONVERTER

BACKGROUND OF THE INVENTION

Field of the Invention

The present invention lies within the field of direct voltage to direct voltage converters, called "DC/DC converters", and relates more particularly to a method for controlling a DC/DC voltage step-down converter, called a "buck converter", intended to provide an output voltage at a regulated value at the terminals of a load.

Description of the Related Art

Voltage step-down converters have numerous applications. In particular, they are used in motor vehicles to reduce the voltage supplied from an electrical source (which may be a battery of the motor vehicle, a voltage regulator connected to the battery, or another source) for the purpose of supplying, notably, electronic computers of said motor vehicles.

Figure 1:
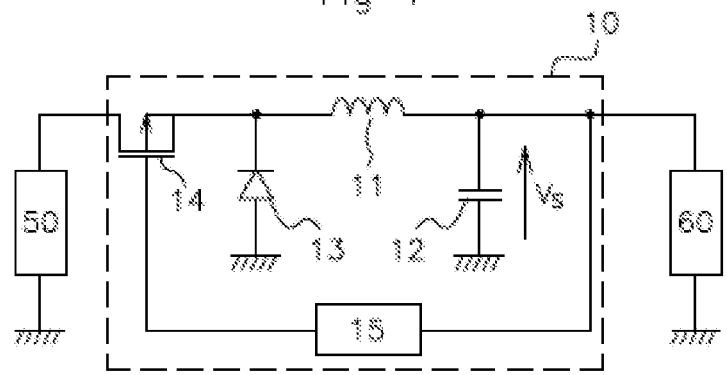

FIG. 1 shows a voltage step-down converter 10, which includes in a conventional way an inductive component 11, one terminal of which is connected to a capacitive component 12 at the output of said voltage step-down converter 10. More particularly, the capacitive component 12 has two terminals, one of which is connected to the inductive component, while the other is connected to the electrical ground.

The other terminal of the inductive component 11 is connected to an electrical source 50 via a controllable switch, called a "regulating switch" 14, adapted to connect and disconnect said inductive component 11 to and from said electrical source 50. Said terminal of the inductive component 11 connected to the electrical source 50 via the regulating switch 14 is also connected to the electrical ground by another switch that may be controllable or non-controllable. In the example illustrated in FIG. 1, said other switch is non-controllable and is formed by a diode 13, one pole of which is connected to a mid-point between the regulating switch 14 and the inductive component 11, while another pole of the diode is connected to the electrical ground.

The voltage step-down converter 10 is used to provide an output voltage $V_S$ whose value is regulated at the terminals of the capacitive component 12, said terminals of the capacitive component 12 being connected to a load 60 such as a microcontroller of an electronic computer of the motor vehicle, for example.

In a conventional manner, the output voltage $V_S$ of the voltage step-down converter 10 is regulated by controlling the regulating switch 14, and for this purpose said voltage step-down converter 10 includes means 15 for controlling said regulating switch 14.

More particularly, the regulating switch 14 is controlled as a function of the value of the output voltage $V_S$ so as to alternate:

intervals called "connection intervals", in which the regulating switch 14 is in an on state, the inductive component 11 then being connected to the electrical source 50, with
  intervals called "disconnection intervals", in which the regulating switch 14 is in an off state, the inductive component 11 then not being connected to said electrical source 50.

Figure 2:
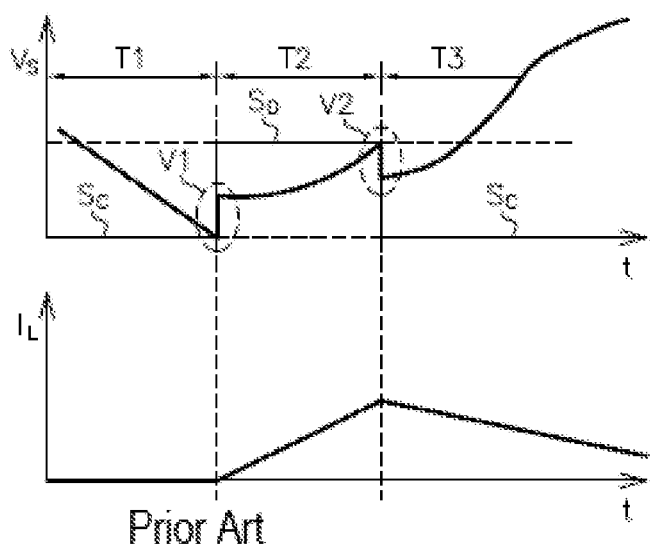

FIG. 2 illustrates the operation of the voltage step-down converter 10, and represents the variation with time of the output voltage $V_S$ and the current $I_L$ flowing in the inductive component 11.

In a first period, the regulating switch 14 is in the off state, during a disconnection interval T1. The current $I_L$ flowing in the inductive component 11 is zero and the output voltage $V_S$ decreases progressively.

When the value of the output voltage $V_S$ reaches a predefined connection threshold $S_C$, the regulating switch 14 is switched to the on state. A connection interval T2 then follows, during which the inductive component 11 is connected to the electrical source 50. The current $I_L$ flowing in the inductive component 11 then increases progressively, as does the output voltage $V_S$ at the terminals of the capacitive component 12.

When the value of the output voltage $V_S$ reaches a predefined disconnection threshold $S_D$, which is greater than the connection threshold $S_C$, the regulating switch 14 is switched to the off state. A disconnection interval T3 then follows, during which the inductive component 11 is not connected to the electrical source 50. The current $I_L$ flowing in the inductive component 11 then decreases progressively.

However, during the disconnection interval T3, the output voltage $V_S$ initially increases, due to the fact that the energy accumulated in the inductive component 11 is at least partially discharged toward the capacitive component 12. This increase in the output voltage $V_S$ cannot be controlled by the regulating switch 14, which is in the off state.

The amplitude of the fluctuations of the output voltage $V_S$ may become greater than the difference between the connection threshold $S_C$ and the disconnection threshold $S_D$.

To limit this fluctuation, there is a known method of approximating the connection threshold $S_C$ and the disconnection threshold $S_D$ to one another. Thus the duration of the connection intervals is reduced, leading to a decrease in the energy accumulated in the inductive component 11 and transmitted to the capacitive component 12 during the disconnection intervals.

However, parasitic elements, notably parasitic inductances of the capacitive component 12, cause abrupt changes in the output voltage $V_S$ whenever the regulating switch 14 changes state. Thus, when the regulating switch 14 is switched to the on state, there is an abrupt increase in the output voltage $V_S$ (reference V1 in FIG. 2). Similarly, when the regulating switch 14 is switched to the off state, there is an abrupt decrease in the output voltage $V_S$ (reference V2 in FIG. 2).

These abrupt changes make it impossible to approximate the connection threshold $S_C$ too closely to the disconnection threshold $S_D$.

SUMMARY OF THE INVENTION

The object of the present invention is to overcome some or all of the limitations of the prior art solutions, notably those described above, by proposing a solution which makes it possible to limit the fluctuations of the output voltage of a DC/DC voltage step-down converter, regardless of the load connected to said DC/DC converter, while being robust to any abrupt changes in the output voltage due to the presence of parasitic elements in said DC/DC converter.

Another object of the present invention is to propose a solution which may, in certain cases, be used in a simple and inexpensive manner, which is a particularly important factor in the field of motor vehicles.

To this end, and according to a first aspect, the invention relates to a method for controlling a DC/DC voltage step-down converter, intended to supply an output voltage at a regulated value from an electrical source, said voltage step-down converter including an inductive component, one terminal of which is connected to the electrical source via a regulating switch, while another terminal of this component is connected to a capacitive output component of said voltage step-down converter. The output voltage is regulated by alternating connection intervals, during which the regulating switch is in an on state, with disconnection intervals during which said regulating switch is in an off state, the regulating switch being switched from the on state to the off state when the value of the output voltage reaches a disconnection threshold, and from the off state to the on state when the value of the output voltage reaches a connection threshold. According to the invention, the disconnection threshold has a variable value which decreases progressively, during each connection interval, from a maximum value of said disconnection threshold which is greater than a maximum value of the connection threshold.

Thus the maximum value of the disconnection threshold can be adjusted to provide immunity to abrupt changes in the output voltage caused by the presence of parasitic elements.

Since the disconnection threshold has a variable and decreasing value, the duration of the connection intervals will be reduced by comparison with the case of a disconnection threshold having a constant value equal to the maximum value of disconnection threshold (adjusted to provide immunity to abrupt changes in the output voltage). Thus the energy accumulated in the inductive component during the connection intervals is reduced by comparison with the case of a disconnection threshold of constant value, causing a reduction in the amplitude of the fluctuations of the output voltage.

Additionally, the duration of the connection intervals is not constant, and depends on the instant of crossover between the output voltage, which increases progressively, and the disconnection threshold, which decreases progressively. Thus, the amplitude of the fluctuations of the output voltage may be limited regardless of the load connected to the voltage step-down converter. This is because, if the load uses a small part of the current flowing in the inductive component, the output voltage will increase rapidly during connection intervals, and will soon cross the disconnection threshold. The energy accumulated in the inductive component will be mainly transmitted to the capacitive component during the disconnection intervals, but will be relatively small because of the reduced duration of the connection intervals. Conversely, if the load uses a large part of the current flowing in the inductive component, the amplitude of the output voltage fluctuations will decrease in any case, owing to the fact that the energy accumulated in the inductive component during the connection intervals will mainly be transmitted to the load during the disconnection intervals.

In specific embodiments, the method for controlling the voltage step-down converter may also have one or more of the following characteristics, considered separately or in any technically feasible combinations.

In a specific embodiment, the disconnection threshold converges progressively, during each connection interval, toward a minimum value of said disconnection threshold.

In a specific embodiment, the maximum value of the connection threshold is lower than or equal to the minimum value of the disconnection threshold.

In a specific embodiment, the connection threshold has a constant value equal to the maximum value of said connection threshold, or has a variable value which increases progressively, during each disconnection interval, toward the maximum value of said connection threshold.

According to a second aspect, the invention relates to a DC/DC voltage step-down converter intended to supply an output voltage at a regulated value from an electrical source, said voltage step-down converter including an inductive component, one terminal of which is connected to the electrical source via a regulating switch, while another terminal of this component is connected to a capacitive output component of said voltage step-down converter. Additionally, said voltage step-down converter includes means for controlling the regulating switch, configured to use a control method according to any of the embodiments of the invention.

In specific embodiments, the voltage step-down converter may also have one or more of the following characteristics, considered separately or in any technically feasible combinations.

In a specific embodiment, the control means include a Schmitt trigger comprising an operational amplifier having a non-inverting input, an inverting input and an output, the output being connected to the non-inverting input by a feedback loop having a capacitive component and a resistive component arranged in series.

Control means of this type are particularly simple and inexpensive to manufacture.

In a specific embodiment, the control means include a Schmitt trigger comprising an operational amplifier having a non-inverting input, an inverting input and an output, said output being connected to said non-inverting input by two feedback loops arranged in parallel, namely:
   a first feedback loop having a capacitive component and a resistive component arranged in series, and
   a second feedback loop having a resistive component.

Control means of this type are particularly simple and inexpensive to manufacture.

According to a third aspect, the invention relates to a motor vehicle having DC/DC voltage step-down converter according to any of the embodiments of the invention.

BRIEF DESCRIPTION OF THE DRAWING FIGURES

Figure 3:
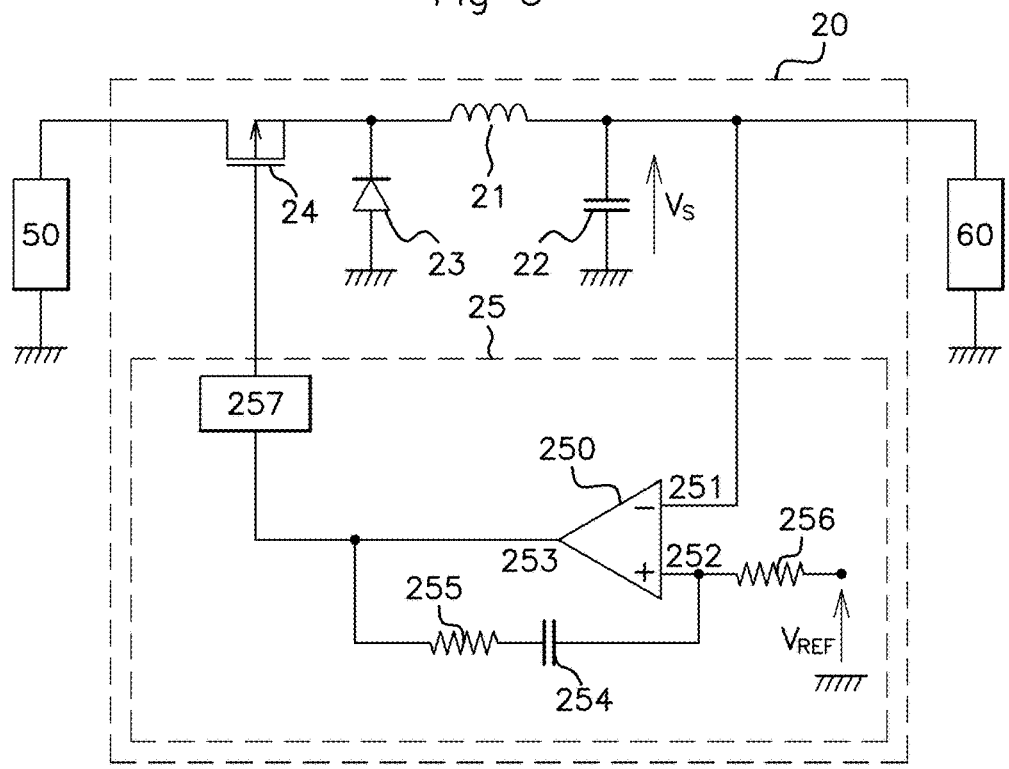
Figure 4:
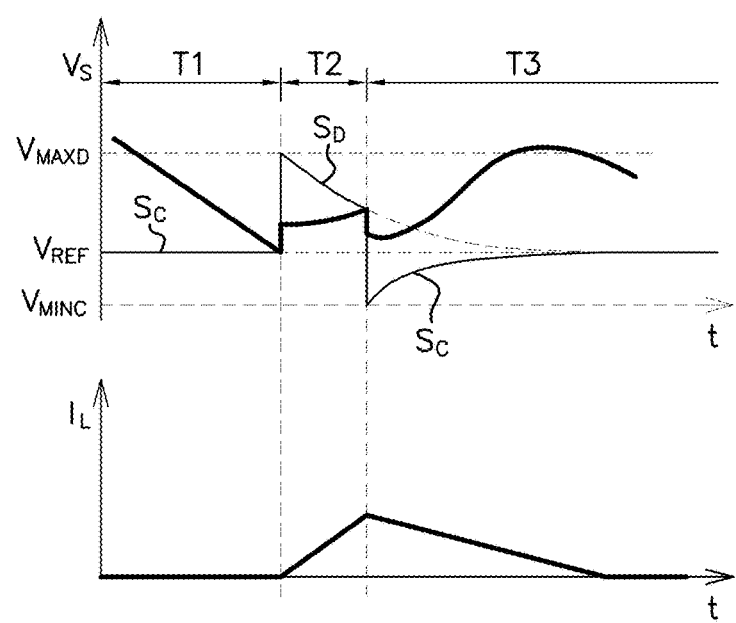
Figure 5:
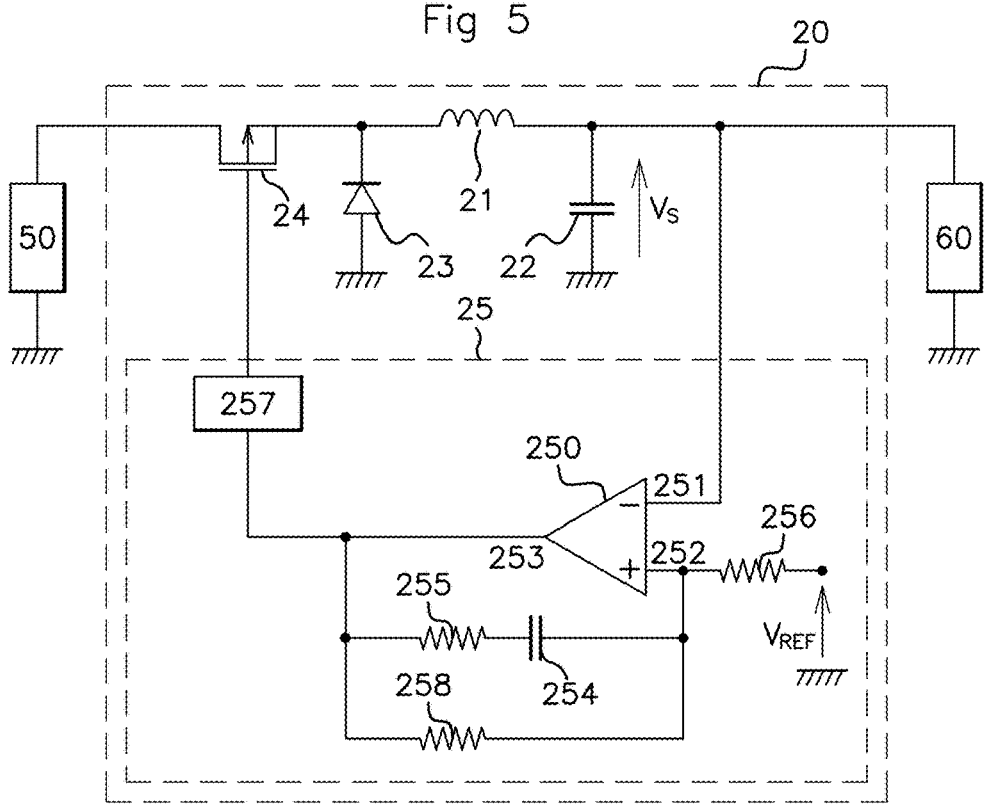
Figure 6:
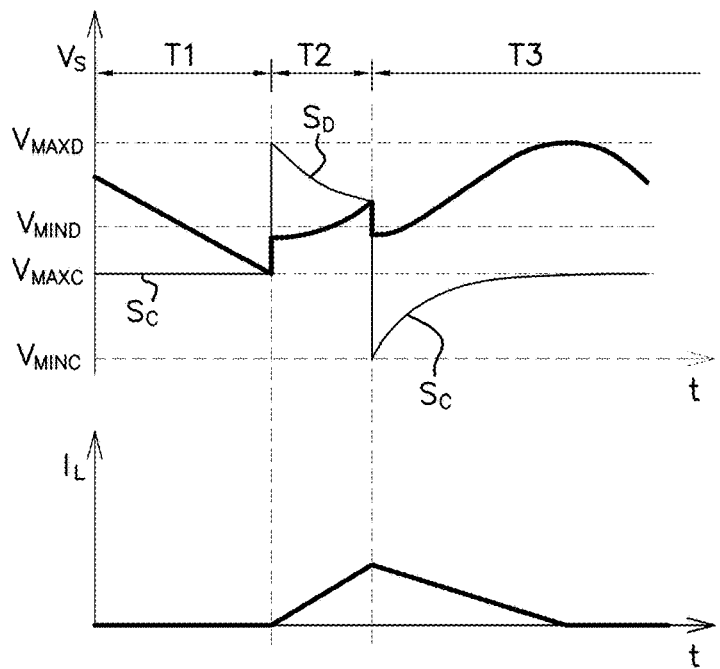

The invention will be more clearly understood from the following description which is provided by way of non-limiting example, and which refers to the drawings which show the following:

FIG. 1: as described above, a schematic representation of a DC/DC voltage step-down converter according to the prior art, FIG. 2: as described above, a diagram showing the operation of the DC/DC voltage step-down converter of FIG. 1, FIG. 3: a schematic representation of a preferred embodiment of a DC/DC voltage step-down converter according to the present invention, FIG. 4: a diagram showing the operation of the DC/DC voltage step-down converter of FIG. 3, FIG. 5: a schematic representation of a variant embodiment of the DC/DC voltage step-down converter of FIG. 3, FIG. 6: a diagram showing the operation of the DC/DC voltage step-down converter of FIG. 5.

In these figures, references which are identical from one figure to another denote identical or similar elements. For the sake of clarity, the elements represented are not to scale unless specified otherwise.

DETAILED DESCRIPTION OF THE INVENTION

FIG. 3 shows an exemplary embodiment of a DC/DC voltage step-down converter 20.

The voltage step-down converter 20 is used to supply an output voltage $V_S$ at a regulated value at the terminals of a load 60, from an electrical source 50. The rest of the description relates in a non-limiting way to the case of a voltage step-down converter 20 installed in a motor vehicle, the electrical source 50 is, for example, a battery of the motor vehicle, or a voltage regulator connected to said battery, or the like. The load 60 is, for example, a microcontroller of an electronic computer of said motor vehicle.

The voltage step-down converter 20 illustrated in FIG. 3 includes an inductive component 21, one terminal of which is connected to a capacitive component 22 at the output of said voltage step-down converter 20. More particularly, the capacitive component 22 has two terminals, one of which is connected to the inductive component 21, while the other is connected to the electrical ground.

The other terminal of the inductive component 21 is connected to the electrical source 50 via a controllable switch, called a "regulating switch" 24, adapted to connect and disconnect said inductive component 21 to and from said electrical source 50. The regulating switch 24 is, for example, a MOSFET transistor. Said terminal of the inductive component 21 connected to the electrical source 50 via the regulating switch 24 is also connected to the electrical ground by another switch that may be controllable or non-controllable. In the example illustrated in FIG. 3, said other switch is non-controllable and is formed by a diode 23, one pole of which is connected to a mid-point between the regulating switch 24 and the inductive component 21, while another pole of the diode is connected to the electrical ground.

The voltage step-down converter 20 also includes means 25 for controlling the regulating switch 24, said control means 25 being configured to use a control method according to the invention, the general principle of which is described below.

More particularly, the control means 25 control the regulating switch 24 in such a way as to alternate, over time,
- intervals called "connection intervals", in which the regulating switch 24 is in an on state, the inductive component 21 then being connected to the electrical source 50, with
- intervals called "disconnection intervals", in which the regulating switch 24 is in an off state, the inductive component 21 then not being connected to said electrical source 50.

Additionally, the control means 25 are configured so that, during the disconnection intervals, the value of the output voltage $V_S$ is compared with a connection threshold $S_C$, and the regulating switch 24 is made to switch to the on state as soon as the value of the output voltage $V_S$ reaches said connection threshold $S_C$.

The control means 25 are also configured so that, during the connection intervals, the value of the output voltage $V_S$ is compared with a disconnection threshold $S_D$, and the regulating switch 24 is made to switch to the off state as soon as the value of the output voltage $V_S$ reaches said disconnection threshold $S_D$.

During each connection interval, the disconnection threshold $S_D$ has a value which is variable over time, and decreases progressively from a predefined maximum value of said disconnection threshold $S_D$.

The maximum value of the disconnection threshold $S_D$ is also greater than a predefined maximum value of the connection threshold $S_C$, in order to provide a hysteresis effect at least at the beginning of each connection interval. It should be noted that, during each disconnection interval, the connection threshold $S_C$ may have a constant value (equal to said maximum value of said connection threshold $S_C$), or may have a variable value which increases progressively toward said maximum value of said connection threshold $S_C$.

FIG. 3 shows a preferred embodiment of the means 25 for controlling the regulating switch 24. In this case, the control means 25 include a Schmitt trigger. The Schmitt trigger includes an operational amplifier 250 having a non-inverting input 252, an inverting input 251 and an output 253.

The output 253 of the operational amplifier 250 is connected to the non-inverting input 252 by a feedback loop having a capacitive component 254 and a resistive component 255 arranged in series. Said non-inverting input 252 is also connected to a reference voltage source $V_{REF}$ by another resistive component 256.

The output voltage $V_S$ of the voltage step-down converter 20 is injected into the inverting input 251 of the operational amplifier 250.

The operating principle of the Schmitt trigger is known to those skilled in the art. The operational amplifier 250 operates in saturated mode and, if $V_{SAT}$ denotes the saturation voltage of said operational amplifier 250, the voltage at the output 253 may take only two values, namely $+V_{SAT}$ or $-V_{SAT}$. The change of voltage on the output 253 (from $+V_{SAT}$ to $-V_{SAT}$, or from $-V_{SAT}$ to $+V_{SAT}$) occurs when the voltage between the non-inverting input 252 and the inverting input 251 changes sign. Additionally, when the voltage on the output 253 changes in this way, the voltage applied to the non-inverting input 252 is also changed, because of the feedback loop.

The control means 25 also include a level matching module 257 for matching the voltage on the output 253 of the Schmitt trigger to the levels required to control the switching of the regulating switch 24 to the off state or to the on state.

The values of the capacitive component 254 and of the resistive components make it possible to adjust the connection threshold $S_C$ and the disconnection threshold $S_D$, which correspond to the voltage applied to the non-inverting input 252 of the operational amplifier 250 during the disconnection interval and the connection interval respectively. It should be noted that, owing to the presence of the capacitive component 254 in the feedback loop, the connection threshold $S_C$ and the disconnection threshold $S_D$ both have values which are variable during the disconnection and connection intervals respectively.

More particularly:
- the connection threshold $S_C$ has a value which increases during the disconnection intervals, between a predefined minimum value $V_{MINC}$ and maximum value $V_{MAXC}$ of said connection threshold $S_C$,
- the disconnection threshold $S_D$ has a value which decreases during the connection intervals, between a predefined maximum value $V_{MAXD}$ and minimum value $V_{MIND}$ of said disconnection threshold $S_D$.

In the example illustrated in FIG. 3, the values of the capacitive component 254 and the resistive components 255, 256 make it possible to adjust the minimum value of the connection threshold $S_C$ and the maximum value of the disconnection threshold $S_D$, as well as the increase of said connection threshold $S_C$ and the decrease of said disconnection threshold $S_D$. It should be noted that, in the example illustrated in FIG. 3, the maximum value $V_{MAXC}$ of the connection threshold $S_C$ and the minimum value $V_{MIND}$ of the disconnection threshold $S_D$ are equal to the reference voltage $V_{REF}$.

The control means 25 illustrated in FIG. 3 are advantageous in that they are simple and inexpensive to manufacture.

FIG. 4 illustrates the operation of the voltage step-down converter 20, and represents the variation with time of the output voltage $V_S$ and the current $I_L$ flowing in the inductive component 21.

In a first period, the regulating switch 24 is in the off state, during a disconnection interval T1. The current $I_L$ flowing in the inductive component 21 is zero, and the output voltage $V_S$ decreases progressively. The connection threshold $S_C$ is constant and equal to its maximum value, that is to say equal to the reference voltage $V_{REF}$.

When the value of the output voltage $V_S$ reaches the connection threshold $S_C$, the voltage at the output 253 of the operational amplifier 250 changes and the regulating switch 24 is switched to the on state, corresponding to the start of a connection interval T2. The voltage applied to the non-inverting input 252 is simultaneously modified, and corresponds, at the start of said connection interval T2, to the maximum value of the disconnection threshold $S_D$. The value of the disconnection threshold $S_D$ then decreases progressively during the connection interval T2, while the capacitive component 254 of the feedback loop becomes charged. The current $I_L$ flowing in the inductive component 21 then increases progressively, as does the output voltage $V_S$ at the terminals of the capacitive component 254 at the output of the voltage step-down converter 20.

When the value of the output voltage $V_S$ reaches the disconnection threshold $S_D$, the voltage at the output 253 of the operational amplifier 250 changes and the regulating switch 24 is switched to the off state, corresponding to the start of a disconnection interval T3. The voltage applied to the non-inverting input 252 is simultaneously modified, and corresponds, at the start of said disconnection interval T3, to the minimum value of the connection threshold $S_C$. The value of the connection threshold $S_C$ then increases progressively during the disconnection interval T3, while the capacitive component 254 of the feedback loop becomes charged. The current $I_L$ flowing in the inductive component 21 decreases progressively, while the output voltage $V_S$ initially increases, due to the fact that the energy accumulated in the inductive component 21 is at least partially discharged toward the capacitive component 254.

It has been found that a suitable choice of the maximum value of the disconnection threshold $S_D$ (and therefore of the values of the Schmitt trigger components) can provide immunity to abrupt changes in the output voltage $V_S$ caused by the presence of parasitic elements. Additionally, owing to the progressive decrease of the value of the disconnection threshold $S_D$, the output voltage $V_S$ reaches said disconnection threshold $S_D$ more rapidly than if said disconnection threshold $S_D$ had had a constant value equal to said maximum value. Thus the energy accumulated in the inductive component 21 is reduced by comparison with the prior art, as is the amplitude of the fluctuations of said output voltage $V_S$ of the voltage step-down converter 20.

FIG. 5 shows a variant embodiment of the means 25 for controlling the regulating switch 24.

In the exemplary embodiment illustrated in FIG. 5, the control means 25 include a Schmitt trigger and a level matching module 257 for matching the voltage at the output 253 of the Schmitt trigger to the levels required to control the switching of the regulating switch 24 to the off or the on state.

The Schmitt trigger illustrated in FIG. 5 includes an operational amplifier 250 having a non-inverting input 252, an inverting input 251 and an output 253.

By contrast with the exemplary embodiment of FIG. 3, the output 253 of the operational amplifier 250 is connected to the non-inverting input 252 by two feedback loops, namely:
  a first feedback loop having a capacitive component 254 and a resistive component 255 arranged in series, as in the example of FIG. 3, and
  a second feedback loop, in parallel with the first feedback loop, having a resistive component 258.

Said non-inverting input 252 is also connected to a reference voltage source VREF by another resistive component 256. The output voltage $V_S$ of the voltage step-down converter 20 is injected into the inverting input 251 of the operational amplifier 250.

FIG. 6 illustrates the operation of the voltage step-down converter 20 of FIG. 5, and represents the variation with time of the output voltage $V_S$ and the current IL flowing in the inductive component 21.

It should be noted that, because of the resistive component 258 of the second feedback loop, the minimum value $V_{MIND}$ of the disconnection threshold $S_D$ and the maximum value $V_{MAXC}$ of the connection threshold $S_C$ are different.

More generally, it should be noted that the implementations and embodiments considered above have been described by way of non-limiting example, and that other variants may therefore be envisaged.

Notably, the invention has been described on the assumption that the means for controlling the regulating switch 24 mainly consist of a Schmitt trigger including a capacitive feedback loop, for the use of the disconnection threshold having a variable and decreasing value. There is no reason why other types of control means should not be used in other examples. According to a non-limiting example, said control means may be digital means in which the output voltage $V_S$ is digitized and then compared with a predefined profile of the disconnection threshold $S_D$ which has been previously stored in an electronic memory.

The invention claimed is:

1. A method for controlling a DC/DC voltage step-down converter, called a "buck converter", configured to supply an output voltage at a regulated value from an electrical source, comprising:
  providing said voltage step-down converter including an inductive component, one terminal of which is connected to the electrical source via a regulating switch, while another terminal is connected to a capacitive component at an output of said voltage step-down converter;
  regulating the output voltage by alternating intervals, called "connection intervals", during which the regulating switch is in an on state, with intervals, called "disconnection intervals", during which said regulating switch is in an off state; and
  switching the regulating switch from the on state to the off state when the value of the output voltage reaches a disconnection threshold, and from the off state to the on state when the value of the output voltage reaches a connection threshold,
  wherein the disconnection threshold has a variable value which decreases progressively, during each connection interval, from a maximum value of said disconnection threshold which is greater than a maximum value of the connection threshold.

2. The method as claimed in claim 1, wherein the disconnection threshold converges progressively, during each connection interval, toward a minimum value of said disconnection threshold.

3. The method as claimed in claim 2, wherein the maximum value of the connection threshold is lower than or equal to the minimum value of the disconnection threshold.

4. The method as claimed in claim 3, wherein the connection threshold has a constant value equal to the maximum value of said connection threshold, or has a variable value which increases progressively, during each disconnection interval, toward the maximum value of said connection threshold.

5. A DC/DC voltage step-down converter, called a "buck converter", configured to supply an output voltage at a regulated value from an electrical source, said voltage step-down converter comprising:
an inductive component, one terminal of which is connected to the electrical source via a regulating switch, while another terminal is connected to a capacitive component at an output of said voltage step-down converter,
wherein said voltage step-down converter includes a controller of the regulating switch, configured to use the method as claimed in claim 1.

6. The converter as claimed in claim 5, wherein the controller comprises a Schmitt trigger comprising an operational amplifier having a non-inverting input, an inverting input and an output, said output being connected to said non-inverting input by a feedback loop having a capacitive component and a resistive component arranged in series.

7. The converter as claimed in claim 5, wherein the controller comprises a Schmitt trigger comprising an operational amplifier having a non-inverting input, an inverting input and an output, said output being connected to said non-inverting input by two feedback loops arranged in parallel, including:
a first feedback loop having a capacitive component and a resistive component arranged in series, and
a second feedback loop having a resistive component.

8. A motor vehicle, which includes the DC/DC voltage step-down converter as claimed in claim 5.

9. The converter as claimed in claim 5, wherein the regulating switch is a MOSFET transistor.

10. The converter as claimed in claim 5, wherein the terminal of the inductive component connected to the electrical source via the regulating switch is also connected to an electrical ground by a controllable or noncontrollable switch.

11. The converter as claimed in claim 10, wherein the controllable or noncontrollable switch is non-controllable and is formed by a diode, one pole of which is connected to a mid-point between the regulating switch and the inductive component, while another pole of the diode is connected to the electrical ground.

12. The method as claimed in claim 1, wherein the regulating switch is a MOSFET transistor.

13. The method as claimed in claim 1, wherein the terminal of the inductive component connected to the electrical source via the regulating switch is also connected to an electrical ground by a controllable or noncontrollable switch.

14. The method as claimed in claim 13, wherein the controllable or noncontrollable switch is non-controllable and is formed by a diode, one pole of which is connected to a mid-point between the regulating switch and the inductive component, while another pole of the diode is connected to the electrical ground.

* * * * *